(12) United States Patent
Hawkins et al.

(10) Patent No.: US 7,836,123 B2
(45) Date of Patent: Nov. 16, 2010

(54) SYSTEM AND METHOD FOR NON-HTTP SESSION BASED PUBLISH/SUBSCRIBE SUPPORT USING PRE-EMPTIVE SUBSCRIPTIONS

(75) Inventors: John C. Hawkins, Hampshire (GB); Matthew R. Whitehead, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 12/119,949

(22) Filed: May 13, 2008

(65) Prior Publication Data

US 2009/0287805 A1 Nov. 19, 2009

(51) Int. Cl.
*G06F 15/16* (2006.01)
(52) U.S. Cl. ...................................... 709/203
(58) Field of Classification Search .................. 709/203
See application file for complete search history.

(56) References Cited

U.S. PATENT DOCUMENTS

| | | | |
|---|---|---|---|
| 7,039,671 B2 | 5/2006 | Cullen | |
| 7,051,118 B2 | 5/2006 | Collison | |
| 7,080,158 B1 | 7/2006 | Squire | |
| 7,080,385 B1 | 7/2006 | Collison et al. | |
| 7,254,616 B1 | 8/2007 | Ennis et al. | |
| 7,334,019 B2 | 2/2008 | Quick et al. | |
| 2005/0065632 A1 | 3/2005 | Douglis et al. | |
| 2005/0251556 A1* | 11/2005 | Ginis et al. | 709/206 |
| 2006/0069587 A1 | 3/2006 | Banks et al. | |
| 2006/0190607 A1 | 8/2006 | Lowery et al. | |
| 2007/0022430 A1 | 1/2007 | Barker et al. | |
| 2007/0050522 A1 | 3/2007 | Grove et al. | |
| 2007/0101341 A1 | 5/2007 | Downing et al. | |
| 2007/0157213 A1 | 7/2007 | Koegel | |

OTHER PUBLICATIONS

Sean Neville, Enterprise Integration Patterns: Emerging Standards and Futures in Enterprise Integration, http://www.enterpriseintegrationpatterns.com/Future.html.

* cited by examiner

*Primary Examiner*—Jeffrey Pwu
*Assistant Examiner*—Farhad Ali
(74) *Attorney, Agent, or Firm*—Scully, Scott, Murphy & Presser, P.C.; Jeanine Ray, Esq.

(57) ABSTRACT

The invention includes a publish/subscribe system for publish/subscribe messaging utilizing pre-emptive subscriptions in a cluster of HTTP servers that includes load balancing. The system includes at least one HTTP client in a role of HTTP subscriber, and a set HTTP servers arranged as an HTTP server cluster in communication with each other and the at least one HTTP client in a network infrastructure, where each HTTP server is subscribed to a special topic: admin/subscriptions, maintains a subscription to requested topics for a client and a message history of messages published on that topic. Each server can serve messages to different HTTP clients at different times based on the HTTP client's "cursor" in the HTTP server's message history list, and wherein any HTTP client request for a "next" message on a given requested topic will follow their cursor progress through the message history list.

11 Claims, 3 Drawing Sheets

SYSTEM AND METHOD FOR NON-HTTP SESSION BASED PUBLISH/SUBSCRIBE SUPPORT USING PRE-EMPTIVE SUBSCRIPTIONS

BACKGROUND OF THE INVENTION

The invention relates to publish/subscribe messaging broadly, and more particularly relates to a novel system and method for publish/subscribe messaging that maintains pre-emptive subscriptions to "subscribed to" topics without the use of cookies to reduce numbers of individual subscriptions managed by a message queuing function from "one client to one subscription" to "one unique subscription to one HTTP server," obviating any need for establishing "client-affinity" between a client and any particular HTTP server.

Publish/subscribe is an asynchronous messaging technology whereby senders (publishers of messages) do not send or publish messages to specific receivers (subscribers of messages), but to topics, or named logical channels. Messages are collections of binary or character data that have some meaning to a participating program. Publish/subscribe data processing systems have become very popular in recent years for distributing data messages (publications between application programs). Publishers are typically not concerned with where their publications are going, and subscribers are typically not interested in where the messages they receive have come from. Published messages are characterized into classes without knowledge or regard to which subscribers (if any) should receive the messages. Subscribers typically receive only a subset of total messages published. The publisher is responsible for defining the classes of messages to which subscribers can subscribe.

Publish/subscribe systems may be either topic or content based. In a topic-based system, messages are published to topics or channels associated by topic. In a content-based system, messages are delivered only to subscribers where attributes or message content matches constraints defined by the subscriber, who is responsible for classifying the messages. A message broker typically assures the integrity of the message source, and manages the distribution of messages according to valid subscriptions registered with the message broker. A configuration manager drives deployment, including storing and managing configuration data used to configure brokers, and hosted by the message queue manager.

Publish/subscribe systems evolved from WebSphere MQ™, where the WebSphere MQ platform now implements an HTTP interface. As in other communication protocols, storage, routing, and delivery information is added to the message before transmission, and stripped from the message prior to delivery to the receiving application. Message queues are objects that store messages in an application. A queue Manager provides a logical container for the message queue. The queue manager (or message broker) is responsible for transferring data to other queue managers via message channels.

Messages are not dependent upon pure packet-based transmissions, such as TCP/IP, to implement the sending (publisher) and receiving (subscriber) ends to be decoupled, and potentially operate asynchronously, thereby. Messages are delivered once and once only, irrespective of errors and network problems. Use of the HTTP interface allows the user to POST and GET messages from either a topic or queue. In known systems, the initial implementation of receiving messages from a topic had a "window of opportunity" whereby clients could "miss" messages being published on the topic.

Several implementation scenarios are outlined below to highlight some shortcomings of conventional techniques.

Scenario 1

1) Client requests message from topic.

2) Server waits a given period to see if any messages are published to that topic.

3) Server returns a message or a "no message received" response.

4) Client reconnects in order to receive next message.

One problem with this "window of opportunity" implementation (scenario), however, is that between actions 3 and 4, a message could have been published on the topic but the client would not receive it. This "window of opportunity" implementation does not cater for any kind of subscription. The following second implementation (scenario) reflects an improvement of the "window of opportunity" implementation.

Scenario 2

1) Client subscribes to topic

2) Client returns to server asking for any messages that have been received since subscribing.

3) Server returns a message or a "no message received" response.

4) go to 2 until such time as messages are not required.

5) Client unsubscribes from topic.

The second scenario, however, highlights a second limitation of known publish/subscribe system operation. That is, for each client that wishes to listen on a topic, a separate subscription is created. In a web-based environment, many tens (and potentially hundreds) of thousands of users could be connected at once. Such a connection obviously requires an enormous number of connections between the HTTP server and the Message queuing system where a 1:1 affinity is maintained between clients and subscribers (subscriptions). But in addition to requiring a great number of connections, where more than one HTTP server takes part in the transaction, the implementation scenario breaks down.

As most HTTP environments rely on horizontal scalability (more than one HTTP server in the cluster), the HTTP-based system must be constructed with an ability to adequately respond to a client potentially being directed to differing HTTP servers on each subsequent request for messages. For that matter, message selection is also an issue in the second scenario. As most messaging technologies already have message selection pushed down into the messaging server, it is important that any solution does not attempt to reproduce message-matching algorithms outside of the messaging system.

Besides the WebSphere MQ publish/subscribe platform with HTTP interface, other known publish/subscribe technologies have similar problems. For example, Bayeux's known publish/subscribe technology platform is faced with the same problems. Bayeux, however, has not implemented a solution that is truly horizontally scalable but instead relies on a client remaining at a single HTTP server using "HTTP keep-alive." Hence, if a client becomes disconnected, they must reconnect using the initial handshaking protocols (where the subscription is re-created when messaging using a Bayeux platform). Bayeux implements its publish/subscribe system with message matching carried out by/within the HTTP server code, rather than by the message engine code.

In addition to use of "HTTP keep alive," Bayeux also implements what are known as "durable subscriptions." Durable subscriptions comprise known publish/subscribe methodology whereby a unique client ID is sent by the client on each message request. Individual servers, therefore, by access to this available unique client ID, have no need to retain client information as to which message the client has received. But this solution, however, is not without shortcomings. For example, there is a one to one mapping between client subscription and server subscription, which is very resource intensive at the messaging server.

The WebSphere MQ platform with HTTP interface implements durable subscriptions. Consequently, if a message is published to a durable subscriber, the subscriber's message copy is maintained within MQ as persistent, regardless of whether the message was published as a persistent message. The problem with such operation is that it is performance prohibitive because all messages then require serialization to disk. Serializing all messages to disk typically results in a potentially large drop in performance, cluster-wide.

A system and method according to inventive principles addresses these deficiencies and related problems.

SUMMARY OF THE INVENTION

To that end, the present invention provides a system, method and computer program product with a set of executable instructions for implementing the method that overcomes the deficiencies and shortcomings of known publish/subscribe technologies, as described.

The invention ensures that an HTTP client's individual subscription is scalable across an HTTP cluster by publishing information describing the subscribing HTTP client in every HTTP server in the cluster, including publishing the HTTP client's subscription, at the time that the HTTP client subscribes to a topic. All the HTTP servers comprising the cluster then subscribe on the HTTP client's behalf, to that topic. Consequently, when the client reds for messages, each other HTTP server is waiting with the messages (if any) that have been collected on the topic. No direct affinity between the client and one particular HTTP server within the server cluster is required.

Where the inventive system or method determines that the HTTP client's HTTP server has responded appropriately, the HTTP server then publishes the details of the services performed. For example, the HTTP server publishes the details of which messages were provided to the client to all the other HTTP servers in the cluster. This inventive feature is functionally equivalent to passing a cursor between the different HTTP servers. If and when a client unsubscribes, an unsubscribe message is published by the HTTP client server to all the other servers to update the subscription records they maintain, with the unsubscribe.

Several requirements for successful operation of a publish/subscribe system or platform in accordance with the invention are now described. That is, the inventive system and method require that each HTTP server comprising the cluster maintain a copy of messages published on every specific topic. As used herein, a message history is data that describes the copies of messages published on every specific topic at an HTTP server. A message history may be stored in memory on the individual HTTP server, or external the HTTP server, e.g., in a database or file repository, or on a queue destination on the same message engine serving the client topics. One subscription is maintained for each topic per HTTP server. If there is more than one client subscribed to one topic, then the server need only maintain one subscription.

The invention also includes a method for publish/subscribe messaging utilizing pre-emptive subscriptions in a cluster of HTTP servers that includes load balancing. The method includes a) an HTTP client sending a subscription request for a topic to any HTTP server of the cluster of HTTP servers, b) one HTTP server receiving and processing the subscription request to determine if a subscription for the requested topic currently exists, and if not, the HTTP server: creates a subscription for the requested topic for the HTTP client, publishes a message on a topic "admin/subscriptions" with information on the newly subscribed requested topic for the HTTP client to all other HTTP servers comprising the cluster such that all the HTTP servers in the cluster subscribe to the requested topic on the requesting HTTP client's behalf and returns to the requesting HTTP client a unique client identifier for the HTTP client's use with subsequent ("next") requests on the subscribed to topic. In addition, the method includes c) the HTTP client receiving the client identifier and using the identifier to send a request for a next available message for the subscription on the requested topic to any one of the HTTP servers comprising the cluster.

The method hither include d) the request for next message is received by any HTTP server, which responds by returning the next message on the subscribed to topic to the HTTP client and publishes a retained message on said topic "admin/subscriptions" that contains details of an updated cursor for the requesting HTTP client, e) the HTTP client sends a request for a next available message on the subscription and f) any HTTP server that receives and processes the request on the subscription subscribes to the topic: "admin/subscriptions" with the updated cursor position for the HTTP client, and uses the updated cursor information to determine which message in its message history is to be sent to the requesting HTTP client next, returns the next message to the HTTP client and publishes a retained message on the topic "admin/subscriptions" containing information about the client's new cursor position. With the method, wherein HTTP client subscriptions and requests for next messages are routed to any HTTP server comprising the cluster controls that the HTTP client associated with a subscription shall automatically receive a next message published on the requested topic without fail and/or duplication.

DESCRIPTION OF THE DRAWINGS

The foregoing and other objects, aspects and advantages will be better understood from the following detailed description of embodiments of the inventions, with reference to the drawings, in which.

DETAILED DESCRIPTION

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for caring out one or more of the functional tasks of the invention, could be utilized.

Figure 1:
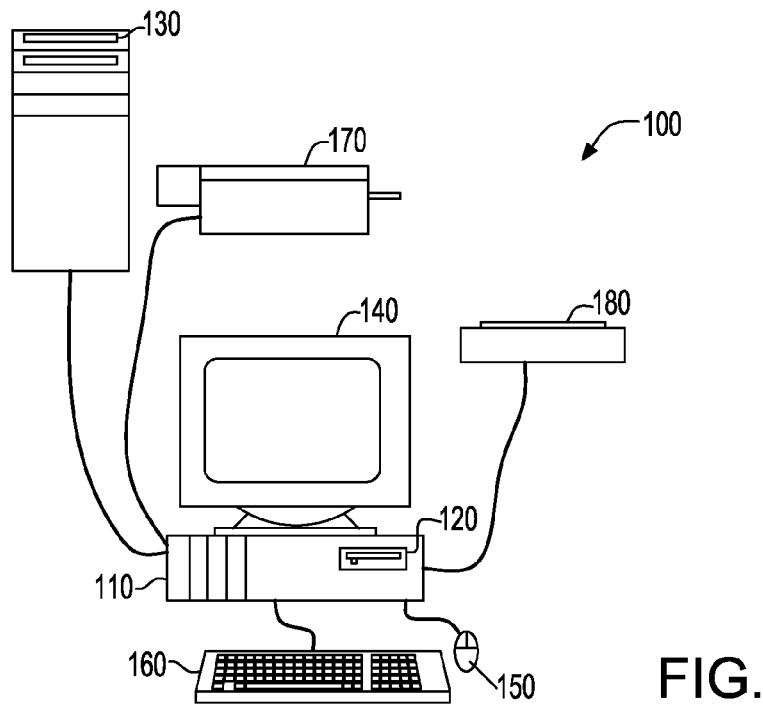
FIG. 1 is a representation of a general purpose computer system with a set of computer-readable instructions that implement one method for maintaining pre-emptive subscriptions to "subscribed to" topics without the use of cookies of the invention.

A computer-based system (100) is depicted in FIG. 1 herein, by which the method of the present invention may be carried out. Computer-based system (100) includes a processing unit (110), which houses a processor, memory and other systems components (not shown expressly in the drawing figure) that implement a general purpose processing system, or computer that may execute a computer program product. The computer program product may comprise media, for example a compact storage medium such as a compact disc, which may be read by the processing unit (110) through a disc drive (120), or by any means known to the skilled artisan for providing the computer program product to the general purpose processing system for execution thereby.

The computer program product comprises all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit (110), as mentioned, or may be located on a remote system such as a server (130), coupled to processing unit (I 10), via a network interface such as an Ethernet interface. Monitor (140), mouse (150) and keyboard (160) are coupled to the processing unit (110), to provide user interaction. Scanner (180) and printer (170) are provided for document input and output. Printer (170) is shown coupled to the processing unit (110) via a network connection, but may be coupled directly to the processing unit. Scanner (I 80) is shown coupled to the processing unit (110) directly, but it should be understood that peripherals might be network coupled, or direct coupled without affecting the ability of the processing unit (110) to perform the method of the invention.

Figure 2:
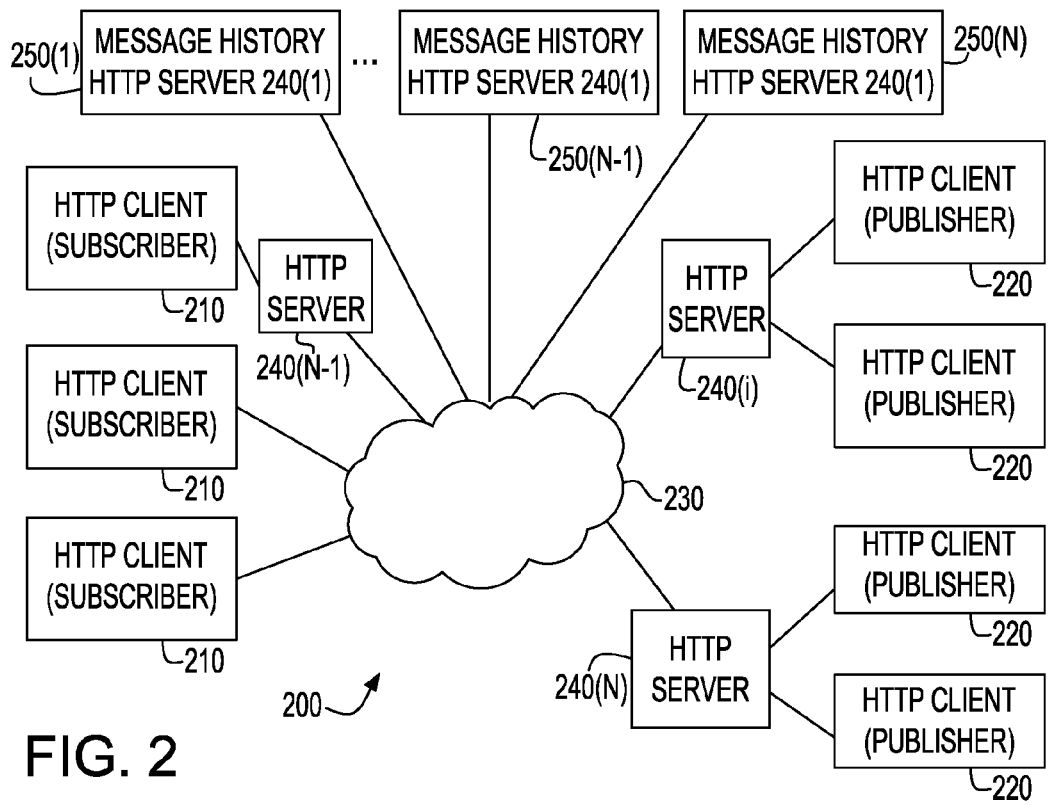
FIG. 2 is a schematic block diagram representative of a system for maintaining pre-emptive subscriptions to "subscribed to" topics without the use of cookies of the invention.

As system embodiment of the invention is now described with respect to FIG. 2. That is, FIG. 2 presents publish/subscribe system (200) for publish/subscribe messaging utilizing pre-emptive subscriptions in a cluster of HTTP servers that includes load balancing. System (200) includes at least one HTTP client (210; subscriber), in a role of HTTP subscriber, and at least one HTTP client (220; publisher) in a role of HTTP publisher in communication via a network infrastructure (230). The skilled artisan will note that the HTTP clients (210; subscribers) and HTTP clients (220; publishers) may operate interchangeably. The HTTP clients (210; 220) are interconnected through HTTP cluster servers (240(1) . . . 240(N)), via to network infrastructure (230).

There are certain minimal requirements for operation in accordance with inventive principles. The first is that all HTTP servers in the load balanced, cluster environment must be subscribed to the topic admin/subscriptions (or similar). In addition, all HTTP servers comprising the cluster, on creating a subscription to a topic on behalf of a client, must maintain a history of messages published on that topic (message histories 250(1), . . . 250(N-1), 250(N), as shown). This is so that the subscribed to messages can be served to different HTTP clients at different times based on the HTTP client's "cursor" in a server-specific message history list. A client that makes regular requests for a "next message" on a given topic will see their cursor progressed through the history list faster than that cursor of a client with a history of making infrequent requests on that topic. The size of the message history is preferably configured by the application developer, or by an administrator.

In more detail, message histories (250(1) . . . 250 (N-1), 250(N)) are shown (included in system (200)), which correspond to each HTTP servers (240(1) . . . 240 (N-1), 240(N)). Message histories (250(1) . . . 250 (N-1), 250(N)) keep or maintain a copy of messages published on a specific topic for a specific HTTP server. While each HTTP server's corresponding message history may be stored in memory in the server computer system, externally in attached memory, externally in a linked database or file, or on a queue destination on the same message engine serving the client topic, the message histories are depicted in FIG. 3 connected directly to the network (230). The message histories are so presented to highlight that any message history may be located in any accessible network location, and not necessarily directly physically attached to the HTTP servers from which they derive. For that matter, the scope of the invention includes that the message histories may be centrally located at a location accessible to their respective HTTP server.

Figure 3A:
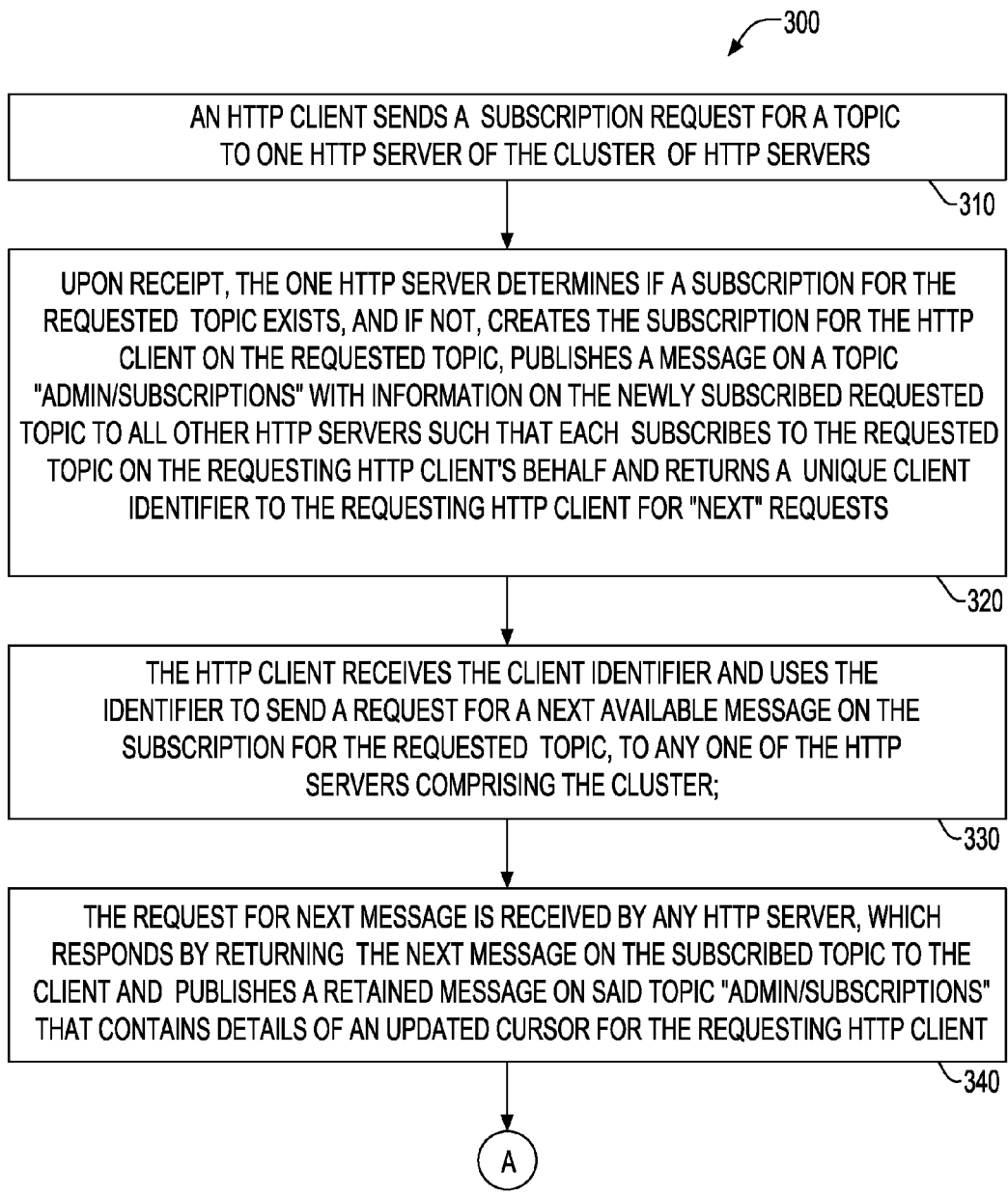
FIGS. 3A and 3B present a schematic flow diagram depicting a preferred embodiment of a method for maintaining pre-emptive subscriptions to "subscribed to" topics without the use of cookies, of the invention.
Figure 3B:
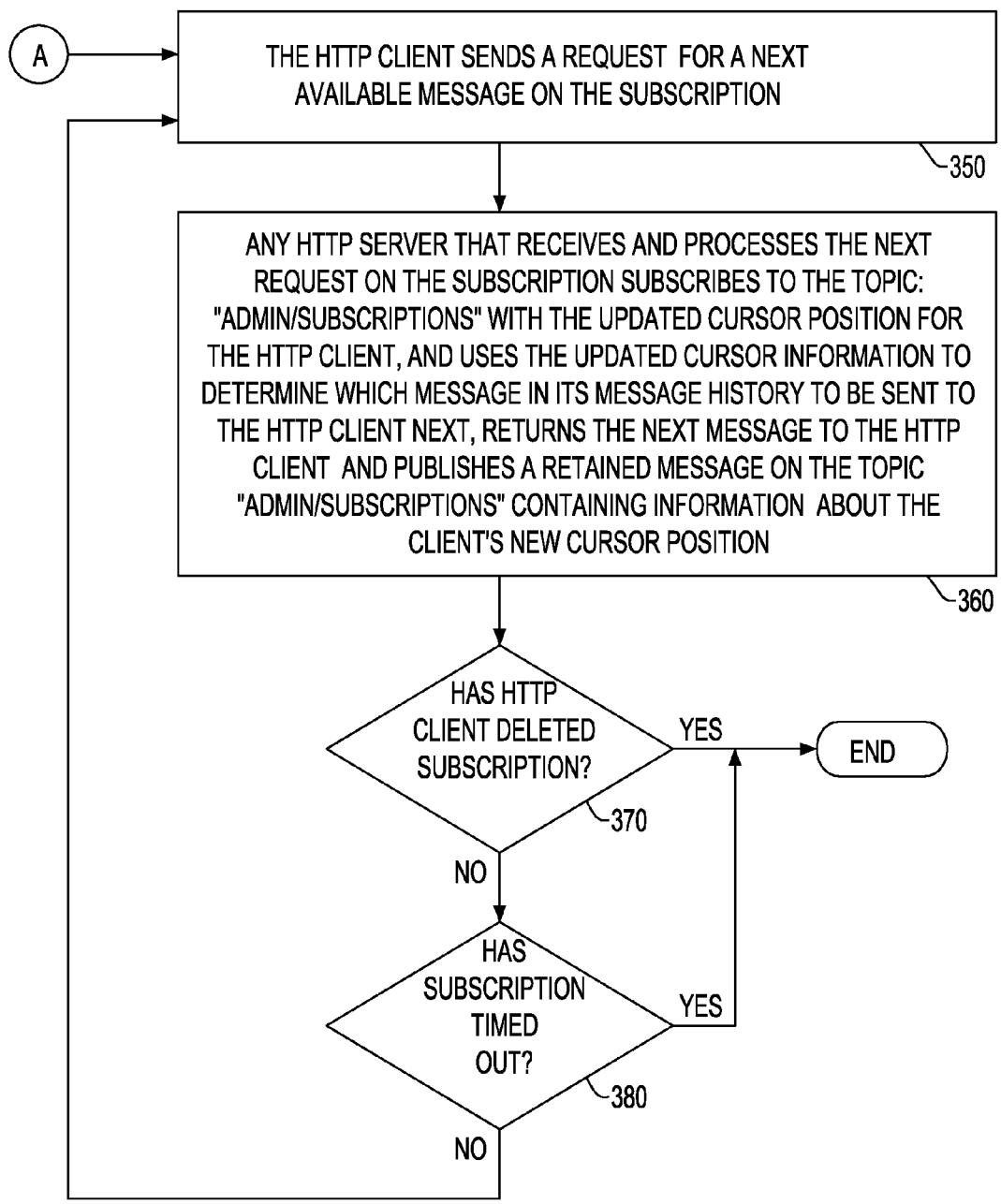

FIGS. 3A and 3B together comprise a schematic flow diagram depicting a method (300) for publish/subscribe messaging utilizing pre-emptive subscriptions in a cluster of HTTP servers that includes load balancing, which programmatically maintains pre-emptive subscriptions to "subscribed to" topics without the use of cookies. Method (300) is implemented to reduce a number of individual subscriptions required to be retained by a message queuing function from "one client to one subscription" to "one unique subscription to one HTTP server." The inventive method further obviates a need for "client-affinity" between a client and one HTTP server.

In a first step (310), method (300) includes that a first HTTP client (subscriber) sends a subscription request for a "new" topic, for example: Wimbledon/matches/centre/score, through a load balancer (not shown in FIG. 2 or 3) to one HTTP server, e.g., HTTP server (240(1)), of the cluster. In step (320), upon receipt of the subscription request, the HTTP server, i.e., HTTP server (240(1)), determines whether a subscription currently exists for the HTTP client on the requested topic (e.g., Wimbledon/matches/centre/score). If no subscription currently exists for the HTTP client on the requested topic, the HTTP server (e.g., HTTP server (240(1))), creates a subscription to the topic for the HTTP client, publishes a message on an administrative topic: "admin/subscriptions" with information on the newly subscribed topic to all other HTTP servers (such that each subscribes to the requested topic on the requesting HTTP client's behalf) and returns to HTTP Client 1 a unique identifier for use on subsequent or "next" requests. Consequently, all other HTTP servers in the load-balanced environment (i.e., cluster comprising HTTP servers (240 (1-N))) receive the published message, and subsequently create a subscription to the topic, associated with the HTTP client's unique identifier.

At step (330), HTTP Client 1 receives the client identifier and uses the identifier to send a request for a next available message on the subscription for the requested topic, to any one of the HTTP servers comprising the cluster. At step (340), the request for the "next" available message for the HTTP client on the subscription is received by any available HTTP server (typically via a load balancing function), for example, HTTP server 1. The responding HTTP server returns the next message on the subscribed topic to the HTTP client, and publishes a retained message on the topic "admin/subscriptions" that contains details of the updated cursor for the requesting HTTP client. Identifier "A" in FIG. 3A is included as a page break, and is also included in FIG. 3B, where the method is continued from step (340) of FIG. 3A.

At step (350; FIG. 3B), the HTTP client sends a request for a next available message on the subscription. At step (360), any HTTP server comprising the cluster receives and processes the request for the next available message from the HTPP client (with unique identifier) on the subscription, and subscribes to the topic: "admin/subscriptions" with the updated cursor position for the HTTP client. The HTTP server uses the updated cursor information and unique identifier to determine which message in its message history is to be sent to the HTTP client next, returns the next message to the HTTP client and publishes a retained message on the topic "admin/subscriptions" containing information about the client's new cursor position. That is, having already created a subscription to: Wimbledon/matches/centre/score (as per step 320), the HTTP server uses the cursor information to determine which message in its message history (list) the HTTP client should receive next.

At step (370), it is determined whether the HTTP client has deleted, or cancelled the subscription. If yes, program flow ends, as indicated by termination indicator END (375). If no, program flow progresses to step (380). In step (380), it is determined whether the HTTP client's subscription has timed out. If yes, program flow ends, indicated by the yes arrow leading to termination indicator END (375). IF now, program flow proceeds to step (350), where steps (350), (360), (370) and (380) are repeated until the method finds that the HTTP client has deleted the subscription, or the subscription for the HTTP client has timed out. If the client unsubscribes, or the subscription times out, an unsubscribe or time-out message is published by the server associated with the HTTP client's message history to all the other servers comprising the cluster so that they will update their subscription records accordingly.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method for publish/subscribe messaging utilizing pre-emptive subscriptions in a cluster of HTTP servers that includes load balancing, comprising steps of:
   a) an HTTP client sending a subscription request for a topic to any HTTP server of the cluster of HTTP servers;
   b) one HTTP server receiving and processing the subscription request to determine if a subscription for the requested topic currently exists, and if not, the HTTP server:
      creates a subscription for the requested topic for the HTTP client;
      publishes a message on a first topic with information on the newly subscribed requested topic for the HTTP client to all other HTTP servers comprising the cluster such that all the HTTP servers in the cluster subscribe to the requested topic on the requesting HTTP client's behalf; and
      returns to the requesting HTTP client a unique client identifier for the HTTP client's use with subsequent ("next") requests to the requested topic;
   c) the HTTP client receiving the client identifier and using the identifier to send a request for a next available message for the subscription on the requested topic to any one of the HTTP servers comprising the cluster;
   d) the request for next message is received by any HTTP server, which responds by returning the next message on the subscribed to topic to the HTTP client and publishes a retained message on said first topic that contains details of an updated cursor for the requesting HTTP client;
   e) the HTTP client sends a request for a next available message on the subscription; and
   f) any HTTP server that receives and processes the request on the subscription subscribes to the first topic with the updated cursor position for the HTTP client, and uses the updated cursor information to determine which message in its message history is to be sent to the requesting HTTP client next, returns the next message to the HTTP client and publishes a retained message on the first topic containing information about the client's new cursor position;
   wherein HTTP client subscriptions and requests for next messages are routed to any HTTP server comprising the cluster controls that the HTTP client associated with a subscription shall automatically receive a next message published on the requested topic without fail and/or duplication.

2. The method for publish/subscribe messaging as set forth in claim 1, further comprising repeating steps e) and f) until one of:
   cancelling the subscription by the requesting HTTP client; and
   timing-out of the requested subscription in accordance with a fixed time period.

3. The method for publish/subscribe messaging as set forth in claim 1, wherein message histories are maintained at any accessible cluster location, and wherein subscriptions are maintained without the use of cookies.

4. The method for publish/subscribe messaging as set forth in claim 1, wherein message histories are maintained at HTTP client servers, and where client-affinity is not required between requesting HTTP clients and HTTP servers.

5. A publish/subscribe system for publish/subscribe messaging utilizing pre-emptive subscriptions in a cluster of HTTP servers that includes load balancing, comprising:
   at least one HTTP client in a role of HTTP subscriber sending a subscription request for a topic to any HTTP server of the cluster of HTTP servers; and
   a set HTTP servers arranged as an HTTP server cluster in communication with each other and the at least one HTTP client in a network infrastructure, where each HTTP server is subscribed to a first topic maintains a subscription to requested topics for a client and a message history of messages published on that topic;
   one HTTP server among the set of HTTP servers receiving and processing the subscription request to determine if a subscription for the requested topic currently exists, and if not, the HTTP server creating a subscription for the requested topic for the HTTP client, publishing a message on a first topic with information on the newly subscribed requested topic for the HTTP client to all other HTTP servers comprising the cluster such that all the HTTP servers in the cluster subscribe to the requested topic on the requesting HTTP client's behalf, and returning to the requesting HTTP client a unique client identifier for the HTTP client's use with subsequent ("next") requests to the requested topic;

the HTTP client receiving the client identifier and using the identifier to send a request for a next available message for the subscription on the requested topic to any one of the HTTP servers comprising the cluster;

the request for next message is received by any HTTP server, which responds by returning the next message on the subscribed to topic to the HTTP client and publishes a retained message on said first topic that contains details of an updated cursor for the requesting HTTP client;

the HTTP client sends a request for a next available message on the subscription; and any HTTP server that receives and processes the request on the subscription subscribes to the first topic with the updated cursor position for the HTTP client, and uses the updated cursor information to determine which message in its message history is to be sent to the requesting HTTP client next, returns the next message to the HTTP client and publishes a retained message on the first topic containing information about the client's new cursor position;

wherein HTTP client subscriptions and requests for next messages are routed to any HTTP server comprising the cluster controls that the HTTP client associated with a subscription shall automatically receive a next message published on the requested topic without fail and/or duplication, wherein each server can serve messages to different HTTP clients at different times based on the HTTP client's "cursor" in the HTTP server's message history list, and wherein any HTTP client request for a "next" message on a given requested topic will follow their cursor progress through the message history list.

6. The publish/subscribe system for publish/subscribe messaging as set forth in claim 5, wherein subscriptions are cancelled either by the requesting HTTP client or by a time-out of the requested subscription in accordance with a fixed time period.

7. The publish/subscribe system for publish/subscribe messaging as set forth in claim 5, wherein message histories are maintained at any accessible cluster location, and wherein subscriptions are maintained without the use of cookies.

8. A storage device readable by a processing circuit and storing computer-readable instructions for execution by the processing circuit for performing a method for publish/subscribe messaging utilizing pre-emptive subscriptions in a cluster of HTTP servers that includes load balancing, comprising steps of:

a) an HTTP client sending a subscription request for a topic to any HTTP server of the cluster of HTTP servers;

b) one HTTP server receiving and processing the subscription request to determine if a subscription for the requested topic currently exists, and if not, the HTTP server:

creates a subscription for the requested topic for the HTTP client;

publishes a message on a first topic with information on the newly subscribed requested topic for the HTTP client to all other HTTP servers comprising the cluster such that all the HTTP servers in the cluster subscribe to the requested topic on the requesting HTTP client's behalf; and returns to the requesting HTTP client a unique client identifier for the HTTP client's use with subsequent ("next") requests to the requested topic;

c) the HTTP client receiving the client identifier and using the identifier to send a request for a next available message for the subscription on the requested topic to any one of the HTTP servers comprising the cluster;

d) the request for next message is received by any HTTP server, which responds by returning the next message on the subscribed to topic to the HTTP client and publishes a retained message on said first topic that contains details of an updated cursor for the requesting HTTP client;

e) the HTTP client sends a request for a next available message on the subscription; and f) any HTTP server that receives and processes the request on the subscription subscribes to the first topic with the updated cursor position for the HTTP client, and uses the updated cursor information to determine which message in its message history is to be sent to the requesting HTTP client next, returns the next message to the HTTP client and publishes a retained message on the first topic containing information about the client's new cursor position;

wherein HTTP client subscriptions and requests for next messages are routed to any HTTP server comprising the cluster controls that the HTTP client associated with a subscription shall automatically receive a next message published on the requested topic without fail and/or duplication.

9. The storage device as set forth in claim 8, wherein the method further comprises repeating steps e) and f) until one of:

cancelling the subscription by the requesting HTTP client; and timing-out of the requested subscription in accordance with a fixed time period.

10. The storage device as set forth in claim 8, wherein the method further comprises that the message histories are maintained at any accessible cluster location, and wherein subscriptions are maintained without the use of cookies.

11. The storage device as set forth in claim 8, wherein the method further comprises that the message histories are maintained at HTTP client servers, and where client-affinity is not required between requesting HTTP clients and HTTP servers.

* * * * *